US006483807B1

(12) United States Patent
Manning et al.

(10) Patent No.: US 6,483,807 B1
(45) Date of Patent: Nov. 19, 2002

(54) DISTRIBUTED CONTROL OF SERVICE CATEGORY REQUEST MAPPING

(75) Inventors: Thomas A. Manning, Northboro; David N. Peck, Northbridge; Robert Constantin, Cambridge, all of MA (US); David E. Hammond, Bedford; Andrew Michal, Windham, both of NH (US); Stephen R. Veit, Chesterfield, MO (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/270,580

(22) Filed: Mar. 16, 1999

(51) Int. Cl.$^7$ .......................... G01R 31/08; G06F 11/00; G08C 15/00
(52) U.S. Cl. ...................... 370/236; 370/396; 370/400; 370/410; 709/238
(58) Field of Search ............................. 370/230, 230.1, 370/231, 235, 236, 395.1, 395.2, 395.21, 395.4, 395.42, 395.43, 396, 400, 410, 522; 709/238, 243

(56) References Cited

U.S. PATENT DOCUMENTS

| 5,790,770 A | * | 8/1998 | McClure et al. ............. 709/231 |
| 6,049,526 A | * | 4/2000 | Radhakrishnan et al. ... 370/229 |
| 6,128,305 A | * | 10/2000 | Hjalmtysson et al. ....... 370/410 |
| 6,301,251 B1 | * | 10/2001 | Kim et al. ............. 370/395.43 |

OTHER PUBLICATIONS

*Affidavit of Thomas A. Manning executed on Aug. 16, 1999 with Exhibits A–H.*
*Affidavit of Mark Bernasconi executed on Dec. 13, 1999 with Exhibits A–E.*
*Affidavit of Jerome Neff executed on Dec. 16, 1999 with Exhibit A.*

* cited by examiner

Primary Examiner—Ajit Patel
Assistant Examiner—Bob A. Phunkulh
(74) Attorney, Agent, or Firm—Weingarten, Schurgin, Gagnebin & Lebovici LLP

(57) ABSTRACT

Each switch along a call setup path in a network decides whether the call request should be upgraded from a non-flow-controlled service type to a flow-controlled service type. Each switch bases the decision on whether a boolean variable for the calling subscriber that appears in a management information base (MIB) is set to a value indicating that the subscriber is entitled to the upgrade. In addition, the upgrade is performed only if an interface on the route to the called party on which the call setup request is to be forwarded supports flow-controlled connections. When the call is to be upgraded, the switch replaces the service type indicator in the setup message with a value indicating a flow-controlled service type, and forwards the setup message toward the called subscriber. If the MIB variable is set to a value indicating that the upgrade is not to be performed, it is still possible for a subscriber to request flow-controlled service directly, by indicating this service type in the original call setup message. Each switch also makes a call down-grade decision. When a call setup message is received requesting flow-controlled service but destined for an interface that does not support flow-controlled operation, the switch replaces the service type indicator in the outgoing setup message with a value indicating a non-flow-controlled service type.

24 Claims, 3 Drawing Sheets

DISTRIBUTED CONTROL OF SERVICE CATEGORY REQUEST MAPPING

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The invention is related to the field of data networks, and in particular to connection-oriented networks such as Asynchronous Transfer Mode (ATM) networks.

ATM networks support several different classes of service. Commonly known existing services include Unspecified Bit Rate (UBR) service, Available Bit Rate (ABR) service, Variable Bit Rate (VBR) service, and others. These different services are made available to network subscribers by equipment in the network, such as a collection of network switches along a path connecting subscribers for data transfer. A calling subscriber can signal which service type is desired by including a particular identifier in a call setup message that is sent along a path toward a called subscriber. The switches along the path examine the service identifier in order to establish certain operational parameters that will be associated with the connection, such as allocated bandwidth, relative priority, etc.

One distinction among services is whether a technique known as "flow control" is employed in carrying out the service. When a flow control mechanism is in place on a network link, data cells are transferred from sender to receiver only when there is high assurance that a buffer is available for storing the packet at the receiver. In this manner, the chances of a cell being dropped at the receiver due to buffer overrun are reduced or eliminated. The sender is aware of this condition as a result of co-operating with the receiver according to the flow control protocol. Flow-controlled connections are generally more efficient than non-flow-controlled connections, because transmission bandwidth is not wasted sending incomplete frames of data, where a frame is a data unit used in network communications that consists of a number of cells. Flow control also reduces any tendency of network to experience the condition of "congestion collapse", which is characterized by persistent cell discarding and re-transmission such that little or no useful traffic is delivered.

Flow-control mechanisms are usually associated with a desired metric or goal for a given connection. For example, an ATM flow-control mechanism known as Quantum Flow Control or QFC is promulgated by an association of network equipment providers known as the Flow Control Consortium. The QFC protocol can be used, for example, to provide ABR cell service with essentially zero cell loss. ABR is characterized by bursty demand for network bandwidth. The QFC protocol provides a feedback mechanism from receiver to sender that enables the sender to control the cell transmission rate in accordance with the expectations for ABR service.

With the advent of flow-control protocols such as QFC in ATM networks, it has become desirable to map non-flow-controlled services to flow-controlled services, and vice-versa. Such mapping enables older "legacy" ATM devices to access devices that use the newer, more efficient services. The mapping is carried out in part during the call setup process. When a calling party requests a non-flow-controlled service such as UBR, the call can optionally be "upgraded" to a flow-controlled service. A switch or other network device through which the call is routed supports non-flow-controlled operation on the interface to the calling party, and supports flow-controlled operation on the interface on the route to the called party, for the duration of such an upgraded call.

Heretofore, the service request mapping functionality in a network device such as a switch has been controlled using a special-purpose workstation external to the switch. According to this scheme, a switch that receives a call setup message notifies the external workstation using a proprietary protocol. The workstation decides whether the call is eligible for upgrade based on interface configuration information. The workstation uses the proprietary protocol to notify the switch whether to upgrade the call or not. The workstation is responsible for processing all call setup requests, and controls all the switches through which call requests are routed. This technique has inferior scalability due to the reliance upon the external workstation. Also, the ability of the switch to operate in different types of network configurations is degraded, due to its reliance upon a non-standard protocol for controlling the service request mapping.

BRIEF SUMMARY OF THE INVENTION

In accordance with the present invention, a technique for distributed control of service request mapping is disclosed that uses standard network management and signaling techniques rather than employing non-standard protocols and equipment. Scalability is improved, and network devices employing the distributed control technique can be used in a wider variety of network configurations by virtue of their enhanced interoperability.

A switch receiving a call setup request from a subscriber that specifies a non-flow-controlled service decides whether the call request should be upgraded to a flow-controlled service type. The decision is based on whether a boolean variable for the calling subscriber that appears in a management information base (MIB) is set to a value indicating that the subscriber is entitled to the upgrade. The upgrade is performed only if the variable is set to TRUE and the interface on which the call setup request is to be forwarded supports flow-controlled connections. When the switch decides to upgrade a call, the switch replaces the service type indicator in the setup message with a value indicating a flow-controlled service type, and forwards the setup message toward the called subscriber. If the MIB variable is set to a value indicating that the upgrade is not to be performed, it is still possible for a subscriber to request flow-controlled service directly, by indicating this service type in the original call setup message. Thus the service mapping technique provides a flexible way for subscribers to access higher-efficiency flow-controlled services.

In accordance with another aspect of the disclosed service mapping technique, a switch can decide to downgrade a call setup request under certain conditions. When a call setup message is received requesting flow-controlled service but destined for an interface that does not support flow-controlled operation, the switch replaces the service type indicator in the outgoing setup message with a value indicating a non-flow-controlled service type. The call downgrading functionality complements the call upgrading process by enabling network devices to maintain compatibility with subscriber terminals or other equipment that does not support flow control.

Other aspects, features, and advantages of the present invention are disclosed in the detailed description that follows.

DETAILED DESCRIPTION OF THE INVENTION

The disclosures of U.S. patent application Ser. No. 08/683,348 filed Jul. 18, 1996, and U.S. Pat. No. 5,790,770 issued Aug. 4, 1998 are hereby incorporated by reference.

Figure 1:
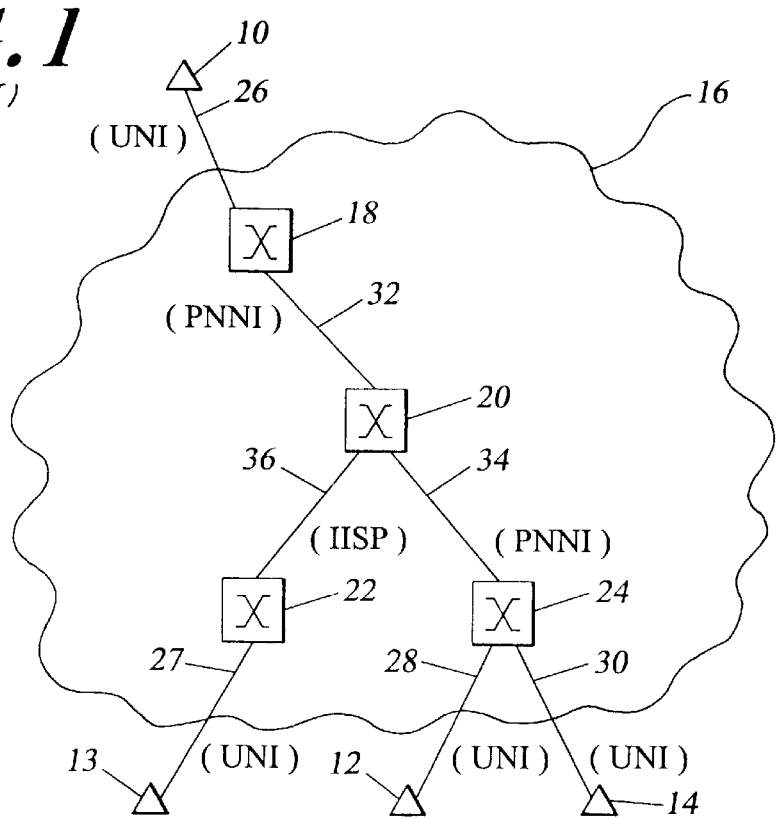
FIG. 1 is a block diagram of a prior art data network.

In FIG. 1, subscriber terminals 10, 12, 13 and 14 communicate over an ATM network indicated generally at 16. The ATM network 16 includes a number of ATM switches 18, 20, 22 and 24. The subscriber terminals 10, 12, 13 and 14 are connected to corresponding ones of the switches 18, 22 and 24 via corresponding User-Network Interface (UNI) links 26, 27, 28 and 30. Switches 18 and 20 are interconnected via a Public Network-to-Network Interface (PNNI) link 32, and switches 20 and 24 are similarly interconnected via a PNNI link 34. Switches 20 and 22 are interconnected via an Interim Inter-Switch Protocol (IISP) link 36.

In the network of FIG. 1, the various components may have different capabilities for employing flow-control protocols when handling data traffic. Thus for example the subscriber terminal 10 may be a so-called "legacy" device that does not support flow control on the UNI link 26, while the switches 18, 20 and 24 are able to support flow control on the links to which they are connected. The switches 18, 20, 22 and 24 are able to selectively map non-flow-controlled services to flow-controlled services, in order to maximize the use of flow-controlled services in the network while supporting legacy devices and services. The mapping process occurs during call setup in a manner described with reference to FIG. 3 below.

Figure 2:
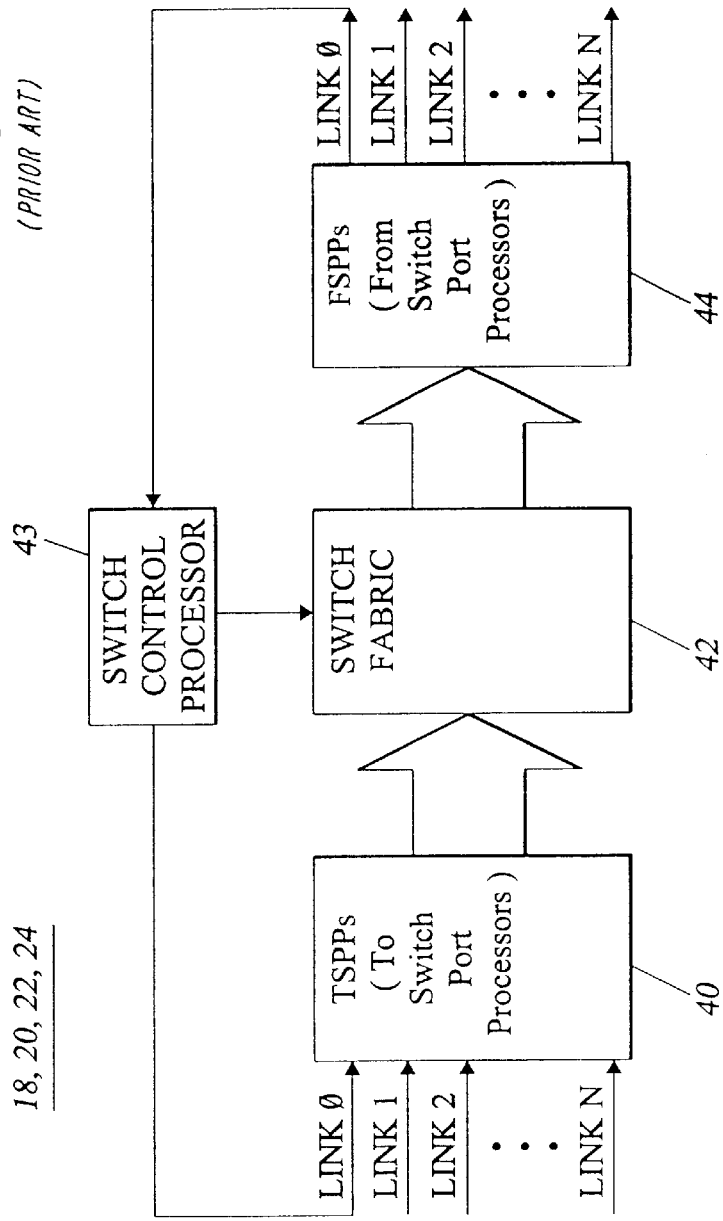
FIG. 2 is a block diagram of a prior art switch in the network of FIG. 1.

FIG. 2 shows a functional layout of each switch 18, 20, 22 and 24. Each switch includes one or more To Switch Port Processors (TSPPs) 40, a switch fabric 42, a switch control processor 43, and one or more From Switch Port Processors (FSPPs) 44. Within the set of TSPPs 40, separate line interface logic is coupled to the receive side of each link connected to the switch. Groups of links are arranged into logical entities called "ports". The receive interface logic for the links within each port share buffer space and other resources within a corresponding TSPP in the set of TSPPs 40. Within the set of FSPPs 40, separate line interface logic is coupled to the transmit side of each link connected to the switch. The transmit interface logic for the links within each port share buffer space and other resources within a corresponding FSPP in the set of FSPPs 40.

The switch fabric 42 provides high-speed configurable interconnections between the TSPPs and FSPPs in order to route cells from incoming links to outgoing links. The switch fabric 42 is controlled by the switch control processor 43. As shown, the switch control processor 43 uses an incoming link and outgoing link for purposes of signaling and other inter-switch communication functions. In particular, the switch control processor 43 is responsible for the call setup processing described below.

Figure 3:
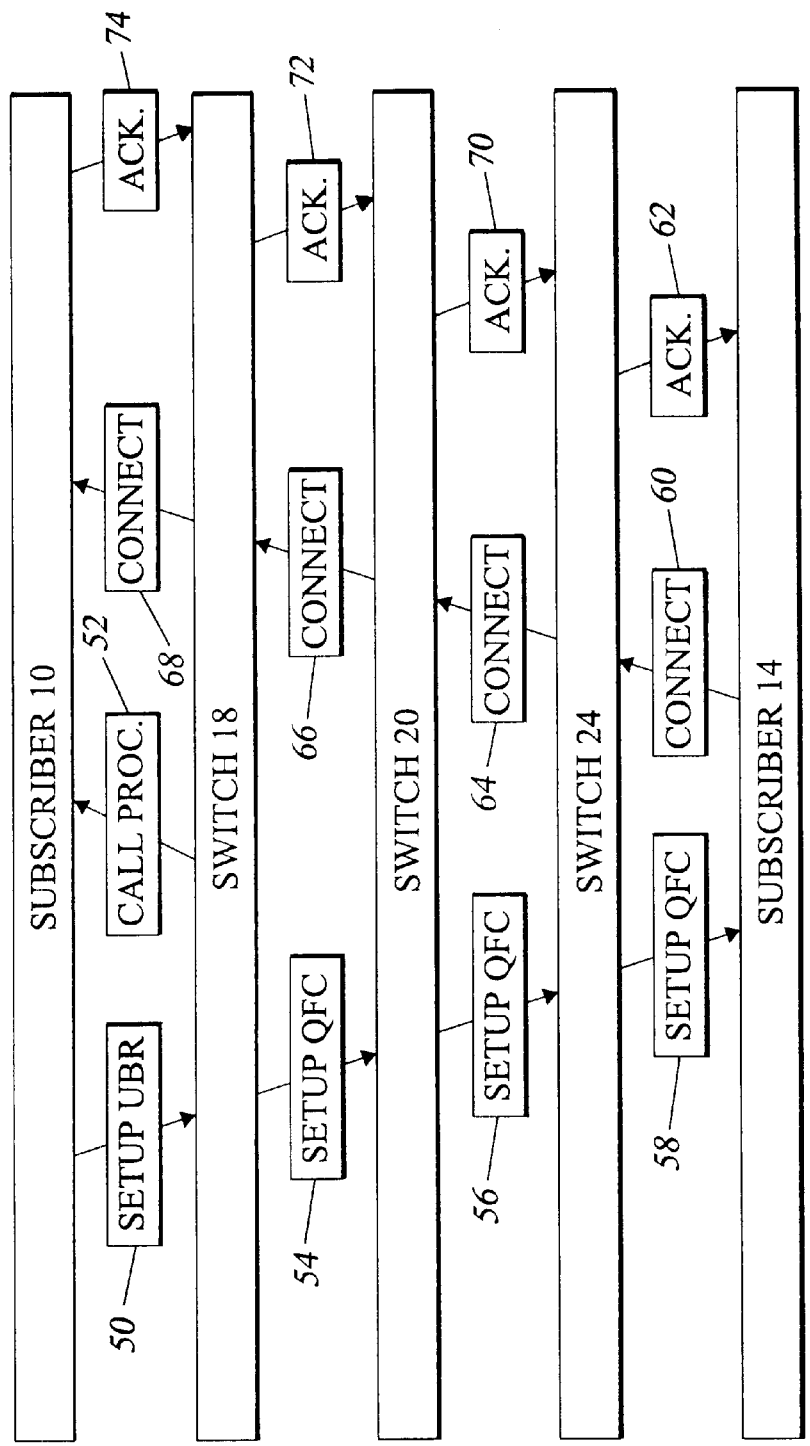
FIG. 3 is a communications flow diagram illustrating operation of switches in the network of FIG. 1 in accordance with the present invention.

FIG. 3 illustrates a process by which a call is placed from the subscriber terminal 10 to the subscriber terminal 14 of FIG. 1. The subscriber terminal 10 transmits a SETUP message 50 to the switch 18. The SETUP message 50 contains a field whose contents indicate a class of desired service for the call, which in the illustrated case is Unspecified Bit Rate or UBR. UBR is a known class of service that does not rely on flow control. UBR is an example of what is referred to as a "best efforts" service, for which there are only minimal Quality of Service (QOS) guarantees. For example, the QOS for UBR service does not include guarantees for maximum packet loss rate or minimum provided data rate.

In response to receiving the SETUP message 50, the switch 18 returns a CALL PROCEEDING message 52 to the subscriber terminal 10 in a known fashion. The switch 18 also forwards a SETUP message 54 toward the called party, in this case toward the subscriber terminal 14, in a known manner. As shown, the SETUP message 54 contains a value in the service class field indicating that a protocol known as Quantum Flow Control (QFC) is to be used in providing the service on the link 32 between the switches 18 and 20. The QFC protocol is a known flow-control protocol that enhances the efficiency and predictability of network operation. In a manner described in greater detail below, the switch 18 decides whether the service requested by the subscriber terminal 10 via the SETUP message 50 is to be "mapped" to a different class of service that employs QFC. In the case illustrated in FIG. 3, of course, the switch 18 has decided that the service request should be so mapped. As described below, under different circumstances the switch 18 decides that mapping should not be performed. When mapping is not to be performed, the SETUP message generated by the switch 18 does not contain the QFC-indicating value in the service class field, but rather contains the UBR-indicating value from the original SETUP message 50.

Upon receiving the SETUP message 54, the switch 20 forwards a SETUP message 56 to the switch 24, and the switch 24 in turn forwards a SETUP message 58 to the subscriber terminal 14. As illustrated, both SETUP messages 56 and 58 contain the QFC-indicating value in the service class field. Before the switches 20 and 24 generate the SETUP messages 56 and 58, they each perform a decision-making process described below in order to determine whether to downgrade the call request to a non-flow-controlled service before forwarding the call request. In the illustrated case, of course, the call has not been so downgraded.

Upon receiving the SETUP message 58, the subscriber terminal 14 returns a CONNECT message 60 to the switch 24, which indicates that the subscriber 14 accepts the call request. If the call were to be rejected by the subscriber terminal 14, then instead a DISCONNECT message would be returned in a known fashion. In response to receiving the CONNECT message 60, the switch 24 returns an acknowledgement (ACK) message 62 to the subscriber terminal 14, and also forwards a CONNECT message 64 to the switch 18. This process repeats at switches 20 and 18, resulting in the passing of CONNECT messages 66, 68 and ACK messages 70, 72. In addition, the subscriber terminal 10 responds to the CONNECT message 68 by returning an ACK message 74. At this point, the call path has been established, and the subscriber terminals 10 and 14 can exchange data.

Each switch 18, 20, 22, and 24 maintains a database used for network management purposes. The database is accessible by external network management devices (not shown) in order to configure each switch for certain operational behavior, and to monitor operational activity in each switch and the network links. In one embodiment the switches 18, 20, 22 and 24 support the Simple Network Management Protocol (SNMP), for which the management database is referred to as a Management Information Base (MIB). A MIB in each switch contains information indicating certain attributes of the attached subscribers, including the subscriber terminals 10, 12, 13 and 14 of FIG. 1. In particular, the MIB contains a variable that indicates whether a given subscriber is entitled to have access to QFC-enhanced services. In the following description, this variable in the MIB is a boolean variable termed "subscriber$_{13}$ upgrade$_{13}$ MIB." The value of this variable for each subscriber is established by network management processes using known techniques.

The switch 18 decides whether to upgrade a call from non-QFC to QFC using the following algorithm. The call is upgraded only if all the following conditions are true:

1. The interface to the calling party is a UNI or IISP interface;
2. The requested service class is a non-flow-controlled class such as UBR;
3. The subscriber upgrade$_{13}$ MIB variable is TRUE for the calling subscriber; and
4. The interface on the route to the called party supports the QFC protocol.

Under the above circumstances, the QFC-indicating value is placed in the service class field of the outgoing SETUP message as shown in FIG. 3.

It should be noted that the above decision algorithm does not interfere with the ability of a subscriber to request QFC-enhanced service independently. When the value of the subscriber— upgrade— MIB variable is FALSE for a subscriber, the switch merely copies the service class value from the incoming SETUP message to the outgoing SETUP message. If the calling subscriber has QFC capability, it can request QFC-enhanced service by placing the QFC-indicating value in the original SETUP message 50. This capability gives calling parties access to both UBR and QFC services, a feature that is useful in setting up Permanent Virtual Circuits (PVCs) and in performing certain internetworking functions.

In some cases, a switch may decide that a call must be downgraded from QFC to non-QFC. This decision is made according to the following criteria:

1. The requested service class is QFC; and
2. The interface on the route to the called party is not enabled for QFC operation. This condition can exist if the interface is intrinsically incapable of QFC operation, or if QFC operation has been disabled by operation of network management.

When a call is downgraded, the value placed in the service class field of the outgoing SETUP message indicates a non-flow-controlled service request.

In the call setup process shown in FIG. 3, the switch 18 has decided that the call is to be upgraded to QFC service. Also, neither of switches 20 and 24 has decided to downgrade the call. Accordingly, the links 26, 32, 34, and 30 of FIG. 1 are operated as follows during the ensuing data portion of the call:

Link 26: non-QFC
Link 32: QFC
Link 34: QFC
Link 30: QFC

The call described above is known as a "point-to-point" call. The service mapping process may also be used with so-called "point-to-multipoint" calls. A point-to-multipoint call is established by first establishing a point-to-point connection, and then generating one or more "add party" messages to add additional parties. Service mapping is also done in response to an "add party" message. Thus in a general sense the service mapping is performed in response to receiving a call management message to connect to a called party, whether the message is a "setup", "add party", or other connection-establishment message.

The decision whether to downgrade a service to a particular called or added party is made independent of any downgrading on other paths of the call. Thus for example, suppose that after establishing the point-to-point connection to subscriber 14 as described above, the subscriber 10 generates an "add party" message to add subscriber 13, and suppose further that the link 36 is not capable of QFC operation. Switch 18 upgrades the "add party", and generates an "add party" message indicating that QFC operation is desired. But switch 20 downgrades the "add party" due to the lack of flow control operation on link 36. During the data phase of the ensuing point-to-multipoint call, the network links are operated as follows:

Link 26: non-QFC
Link 32: QFC
Link 34: QFC
Link 30: QFC
Link 36: non-QFC Link 27: non-QFC While in foregoing the use of the service mapping technique has been described in connection with UBR service in particular, the technique is applicable to other non-flow-controlled service types. For example, the technique may be applied to VBR service by mapping to a flow-controlled service with a guaranteed sustained rate within the network.

It will be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. A method of conditionally mapping a network service from one type to another type, comprising the steps of:

if upon receiving an incoming call management message from a calling subscriber requesting a connection to a called party, the following conditions are satisfied: (i) a network service type signaled in the call management message is a non-flow-controlled network service type, (ii) mapping of the network service for the calling subscriber is enabled, and (iii) a flow-controlled network service type is supported on an interface on a route to the called party, then forwarding a first type of outgoing call management message on the interface on the route to the called party, the first type of outgoing call management message signaling the flow-controlled network service type; and if upon receiving the incoming call management message from the calling subscriber, mapping of the network service for the calling subscriber is not enabled, then forwarding a second type of outgoing call management message on the interface on the route to the called party, the second type of outgoing call management message signaling the same service type signaled in the incoming call management message.

2. A method according to claim 1, further comprising the step of:

if upon receiving the incoming call management message from the calling subscriber, the incoming call management messages signals the flow-controlled network service type and the flow-controlled network service type is not available on the interface on the route to the called party, then forwarding a third type of outgoing call management message on the interface on the route to the called party, the third type of outgoing call management message signaling a non-flow-controlled network service type.

3. A method according to claim 2, wherein the interface on the route to the called party is capable of providing flow-controlled service when enabled, and wherein the flow-controlled network service type on the interface on the route to the called party has been disabled.

4. A method according to claim 2, wherein the interface on the route to the called party is not capable of providing flow-controlled service.

5. A method according to claim 1, wherein the flow-controlled service type is flow-controlled available bit rate (ABR) service.

6. A method according to claim 1, wherein the non-flow-controlled service type is unspecified bit rate (UBR) service.

7. A method according to claim 1, wherein the interface on the route to the called party is a Public Network-to-Network Interface (PNNI) interface.

8. A method according to claim 1, wherein the service type for each call management message is signaled by a corresponding value in a field of the message.

9. A method according to claim 1, wherein mapping of the network service for the calling subscriber is indicated to be enabled by setting a corresponding flag in a user database.

10. A method according to claim 9, wherein the user database is a network management information base.

11. A method according to claim 1, wherein the incoming call management message from the calling subscriber is a call setup message.

12. A method according to claim 1, wherein the incoming call management message from the calling subscriber is an add party message.

13. A network switch, comprising:

a first port processor operative to receive an incoming call management message from a calling subscriber, the incoming call management message requesting a connection to a called party;

a second port processor operative to forward messages on an interface on a route to the called party; and a central processor coupled to the first port processor and the second port processor, the central processor being operative to:

receive the incoming call management message from the first port processor;

if upon receiving the incoming call management message, the following conditions are satisfied: (i) a network service type signaled in the call management message is a non-flow-controlled network service type, (ii) mapping of the network service for the calling subscriber is enabled, and (iii) a flow-controlled network service type is supported on the interface on the route toward the called party, then to forward a first type of outgoing call management message to the second port processor for forwarding on the interface on the route to the called party, the first type of outgoing call management message signaling the flow-controlled network service type; and if upon receiving the incoming call management message, mapping of the network service for the calling subscriber is not enabled, then to forward a second type of outgoing call management message to the second port processor for forwarding on the interface on the route to the called party, the second type of outgoing call management message signaling the same service type signaled in the incoming call management message.

14. A network switch according to claim 13, wherein the central processor is further operative, if the incoming call management message signals the flow-controlled network service type and the flow-controlled network service type is not available on the interface on the route to the called party, to forward a third type of outgoing call management message to the second port processor for forwarding on the interface on the route to the called party, the third type of outgoing call management message signaling a non-flow-controlled network service type.

15. A network switch according to claim 14, wherein the interface on the route to the called party is capable of providing flow-controlled service when enabled, and wherein the availability of the flow-controlled network service type on the interface on the route to the called party has been disabled.

16. A network switch according to claim 14, wherein the interface on the route to the called party is not capable of providing flow-controlled service.

17. A network switch according to claim 13, wherein the flow-controlled service type is flow-controlled available bit rate (ABR) service.

18. A network switch according to claim 13, wherein the non-flow-controlled service type is unspecified bit rate (UBR) service.

19. A network switch according to claim 13, wherein the interface on the route to the called party is a Public Network-to-Network Interface (PNNI) interface.

20. A network switch according to claim 13, wherein the service type for each call management message is signaled by a corresponding value in a field of the message.

21. A network switch according to claim 13, wherein mapping of the network service for the calling subscriber is indicated to be enabled by setting a corresponding flag in a user database.

22. A network switch according to claim 21, wherein the user database is a network management information base.

23. A network switch according to claim 13, wherein the incoming call management message from the calling subscriber is a call setup message.

24. A network switch according to claim 13, wherein the incoming call management message from the calling subscriber is an add party message.

\* \* \* \* \*

UNITED STATES PATENT AND TRADEMARK OFFICE
CERTIFICATE OF CORRECTION

PATENT NO. : 6,483,807 B1  
DATED : November 19, 2002  
INVENTOR(S) : Thomas A. Manning et al.

It is certified that error appears in the above-identified patent and that said Letters Patent is hereby corrected as shown below:

Column 5,  
Lines 14 and 15, ""subscriber$_{13}$upgrade$_{13}$MIB."" should read  
-- "subscriber_upgrade_MIB." --;  
Line 25, "subscriber upgrade$_{13}$MIB" should read -- subscriber_upgrade_MIB --;  
Line 35, "subscriber– upgrade– MIB" should read -- subscriber_upgrade_MIB --; and Column 6,  
Line 29, "Link 36: non-QFC Link 27: non-QFC" should read  
-- Link 36: non-QFC  
  Link 27: non-QFC --.

Signed and Sealed this

Eighteenth Day of November, 2003

JAMES E. ROGAN  
*Director of the United States Patent and Trademark Office*